United States Patent [19]
Luthi

[11] Patent Number: 5,503,737
[45] Date of Patent: Apr. 2, 1996

[54] AIR INFLOW RESTRICTOR FOR DISC FILTERS

[75] Inventor: Oscar Luthi, Nashua, N.H.

[73] Assignee: Ingersoll-Rand Company, Woodcliff Lake, N.J.

[21] Appl. No.: 279,603

[22] Filed: Jul. 25, 1994

[51] Int. Cl.$^6$ ............................................... B01D 33/09
[52] U.S. Cl. ..................... 210/138; 210/247; 210/404; 210/406
[58] Field of Search ..................... 210/138, 247, 210/406, 422, 486, 404, 238, 331, 332, 346, 347, 390

[56] References Cited

U.S. PATENT DOCUMENTS

| | | | |
|---|---|---|---|
| 3,233,736 | 2/1966 | Vernay | 210/404 |
| 3,363,774 | 1/1968 | Luthi | 210/404 |
| 4,683,059 | 7/1987 | LaValley | 210/404 |
| 5,053,123 | 10/1991 | Clarke-Pounder et al. | 210/406 |

Primary Examiner—Robert A. Dawson
Assistant Examiner—W. L. Walker
Attorney, Agent, or Firm—Walter C. Vliet; Michael H. Minns

[57] ABSTRACT

A rotary filter valve is provided with a variable restriction of the timing plate which minimizes bypass gas entering the vacuum system during emergence of the filter elements from the submerged condition.

12 Claims, 2 Drawing Sheets

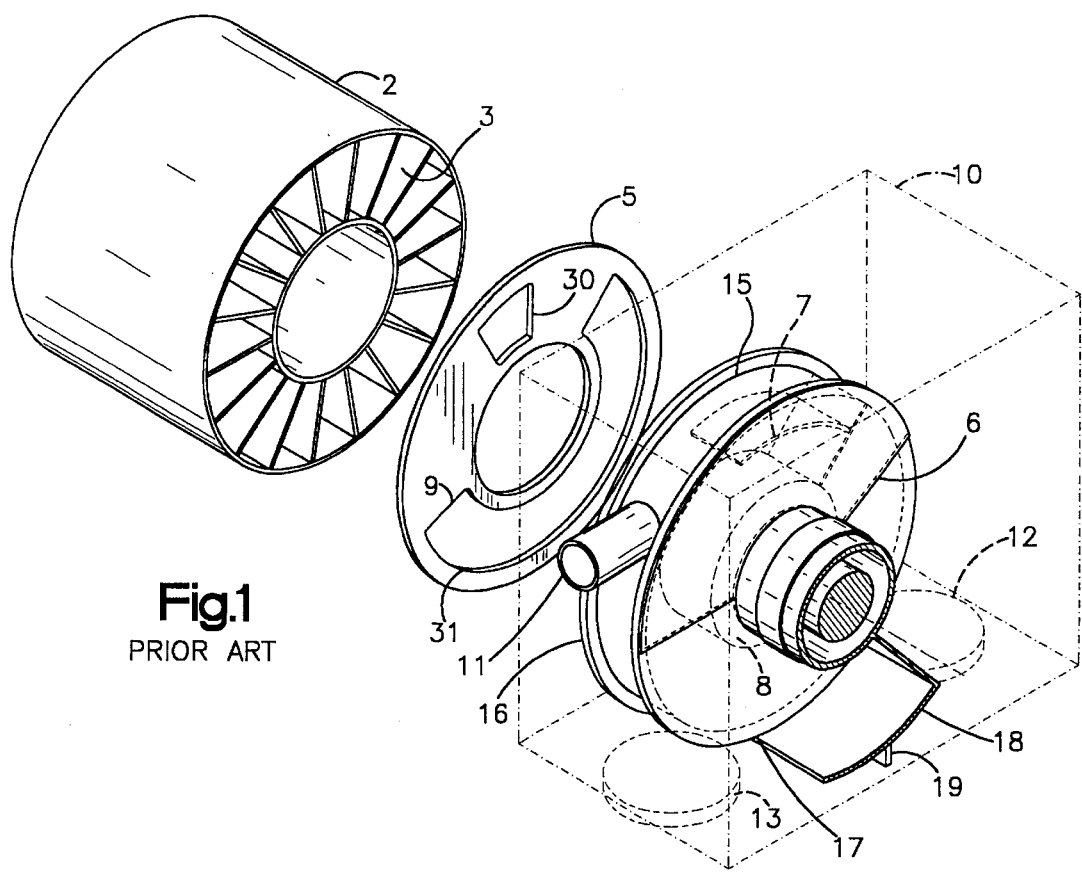
Fig.1
PRIOR ART
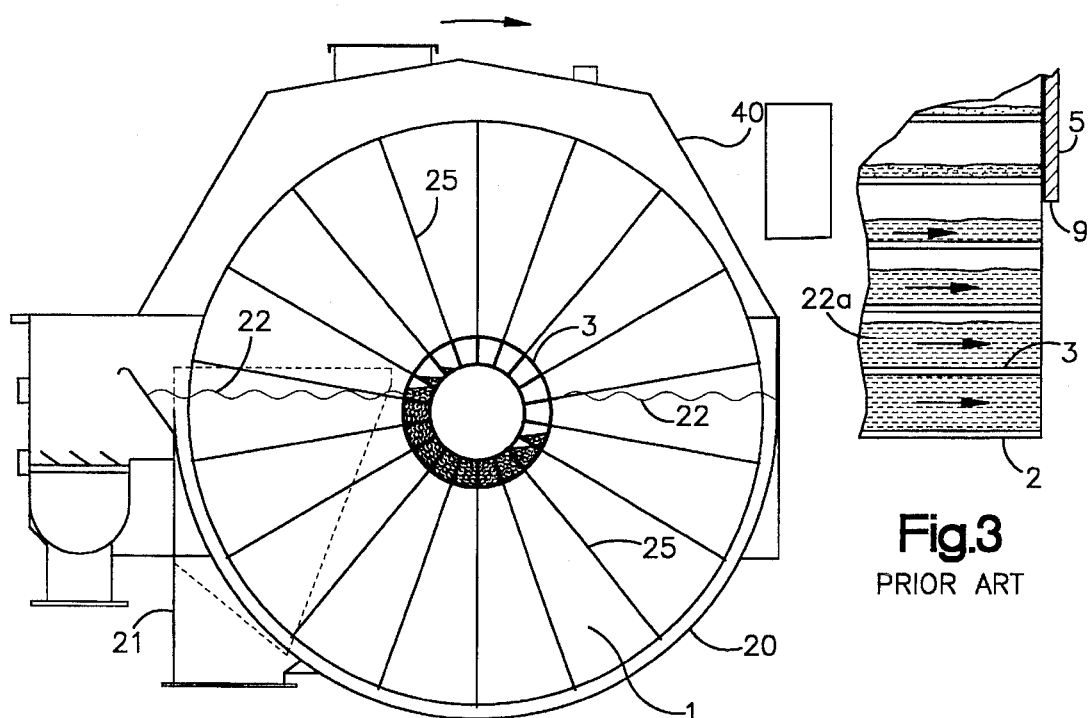
Fig.2
PRIOR ART
Fig.3
PRIOR ART

AIR INFLOW RESTRICTOR FOR DISC FILTERS

BACKGROUND OF THE INVENTION

This invention relates generally to valves for disc filters and the like and more particularly to a disc filter valve which incorporates a feature minimizing the bypass of air upon emergence of the filter from the pulp slurry at the end of a vacuum on cycle. In the prior art the vacuum was left on the filter element emerging from the slurry pool in order to assist the retention of the mat formed on the filter element during filter emergence from the pool. As the filter begins to emerge from the slurry pool increasing quantities of air are sucked into the filter and transferred via the segmented collection channels to the filter valve where it is subsequently distributed to the vacuum system. This substantially decreases the vacuum efficiency for the unit.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention increased vacuum efficiency is accomplished by providing an air flow restrictor for a valve for a rotary disc filter of the type having discrete elements entering and emerging from a submerged filter zone, the valve comprising: a hollow valve body having one end essentially open for receiving filtrate collected in segmented channels radially disposed about the center of a filter shaft, the segmented channels further receiving filtrate from filter elements of discretely varying composition of filtrate volume and bypass gas; a collection means having port means for controlling the receiving of the filtrate disposed at the one end of the valve body; a chamber formed within the valve body for receiving the filtrate; a vacuum means in communication with the chamber for withdrawing collected filtrate from the chamber; and the collection means being further provided with a means for selectively restricting the amount of bypass gas entering the valve body while continuing to permit filtrate flow onto the valve body on transition of the filter from the submerged filter zone.

The foregoing and other aspects will become apparent from the following detailed description of the invention when considered in conjunction with the accompanying drawing figures.

BRIEF DESCRIPTION OF THE DRAWING FIGURES

FIG. 1 is an exploded isometric view of a disc filter valve according to the prior art;

FIG. 2 is a cross section of a disc filter drum showing the various elements of a typical rotary disc filter according to the prior art;

FIG. 3 is a schematic cross section taken longitudinally along a portion of the segmented collection channels of a valve according to the prior art;

DETAILED DESCRIPTION

Figure 4:
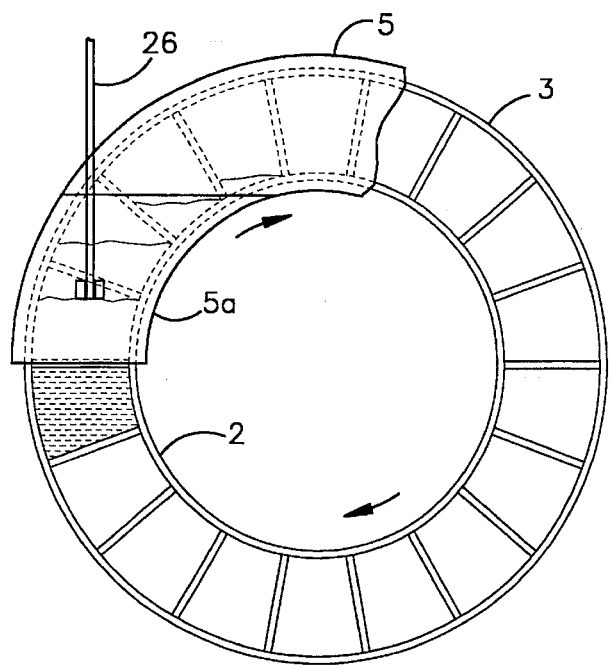
FIG. 4 is a schematic end view of the segmented collection channel of a disc filter showing a portion of a valve timing adjustable seal plate according to the present invention.

Referring first to FIG. 2, a conventional pulp disc filter is shown and generally designated by the reference numeral 1. Fibrous pulp material 22 is fed into the disc filter vat 20 which is generally formed in the shape of a half cylindrical drum having a cover 40. In typical operation the vat 20 is filled to slightly over center level of the rotating shaft. Filtration is accomplished by rotating the individual pie shaped filter sectors 25 which form the discs of the disc filter through 360 degree of rotation. This takes the individual pie shaped sectors 25 through a sector wherein they are submerged in the pulp and through a sector wherein the pulp that is filtered and formed on the filtering surfaces of the sectors are stripped by shower means or the like (not shown) from the screenlike filtering surface. The stripped pulp is collected in discharge troughs or chutes 21 through which the filtered pulp exits the filter.

To better understand the nature of the present invention it is desirable to understand the sequence of filtration and fiber mat formation. In referring to FIG. 2, as previously stated, pulp is fed into the vat wherein a level 22 of approximately half or greater of the diameter of the disc is maintained.

Taking the sequence from just before the pie shaped sectors 25 enter the pulp and considering clockwise rotation as viewed in FIG. 2, a fiber mat forms on the filtering surface of the sector 25 as it begins to submerge. At some optimum time after complete submergence of the sector, vacuum is applied to induce a greater pressure differential across the initially formed pulp mat. This promotes more filtrate to be drawn through the mat while at the same time increasing the deposit of more fibers on the mat. As more fibers are deposited, the mat thickens resulting in increased filtrate clarity. Filtrate obtained during the initial portion of the cycle contains fine material and fibers which pass through the filtering surface of the sectors during initial formation of the fiber mat. The initial or cloudy filtrate can be recycled for clarification or used for dilution purposes elsewhere. The later progressively cleaner clear filtrate can be separated from the cloudy filtrate in the valve box. The clear filtrate is sufficiently clear to be used for shower water or for disposal to the environmental treating system.

The vacuum is cut off on emergence of the sector from the pulp. The fiber mat is further dewatered by residual vacuum until the sector reaches the knockoff shower (not shown) which cuts the top of the mat loose from the filtration media and allows the mat to peel off and fall into the mat discharge chute 21.

To this point the description of a disc filter operation has been fairly standard of the pulp disc filter process. Further, in the past, it has been the practice to provide an atmospheric drain to remove residual filtrate prior to submergence of the segment in the vat and application of the vacuum.

Referring now to FIG. 1, a schematic diagram of the overall layout of a disc filter valve is shown including its orientation to the center shaft 2 of the disc filter. In general, the disc filter valve is shown contained within a vacuum box 10. Provisions in the vacuum box are provided for an atmospheric drain 11, a cloudy barometric vacuum leg 12 and also a clear barometric vacuum leg 13. The barometric legs create the vacuum within the vacuum box. The valve itself is generally comprised of a hollow cylindrical segment 15 having a flange 16 on the inlet side and a flange 17 on the outlet side.

A rotatably mounted splitter plate 18 cooperates with a wiper seal 19 to effect distribution of the vacuum filtrate to either the cloudy barometric leg 12 or the clear barometric leg 13. The outlet side of the valve housing is spaced from the rear wall of the vacuum box to permit vacuum obtained filtrate to be distributed by means of the splitter plate which extends to the rear wall of the vacuum box.

The center shaft 2 of the disc filter is provided with the individual drainage channels 3 from the filter segments. The drainage channels deliver the filtrate collected in each disc segment to the end of the disc filter where it is received and distributed by the distribution valve.

As seen in FIG. 1, the filtrate is received in the valve through a valve collection disc plate 5. The disc plate 5 also accomplishes the timing of the valve with regard to vacuum application and the timing of the atmospheric drain. A rear vacuum blanking sector plate 6 seals the upper portion of the valve housing from the vacuum in the vacuum box 10. An internal baffle 7 cooperates with the center core 8 of the valve and the atmospheric drain 11 to produce an atmospheric chamber for receipt of the atmospheric and residual filtrate obtained after vacuum is cut off which exits valve through the atmospheric drain 11.

It is important to understand that the valve timing seal plate or collection separation plate 5 controls the acceptance of filtrate acquired from the segmented channels 3 of the center shaft, as well as the period of atmospheric draining. The plate is shown with an atmospheric drain port 31 and a vacuum on port 30.

Referring to FIG. 3, the valve timing seal plate vacuum on port 30 is shown having a trailing edge 9 which cooperates with segmented drainage channels associated with emerging filter elements. As depicted in FIG. 3, as a leaf emerges from the pulp in the vat (level shown as 22a) air is starting to get pulled into the leaf and the velocity of filtrate in the segmented channels increases because of the lower flow resistance of the air. This takes place quite rapidly and the channels may be completely drained in about 3½ seconds or even faster in a smaller machine. By the time the leaf has completely emerged, the core is almost empty. The air can bypass the filtrate at great speed with a partially full core as shown in FIG. 3. This produces an excess of air in the valve box destroying the vacuum from the barometric leg. This is less of a problem for slow draining stock because air cannot enter the leaves freely through a tight mat, therefore the leaves and core flow channels drain much slower.

In faster draining stock gas bypass becomes a greater problem. One possible solution would be to extend the valve timing plate for an earlier vacuum cutoff. However, this would reduce the sheet drying time and the adherence of the pulp mat. In addition, the leaves could not be drained completely of filtrate which would thereafter rewet the pulp mat. Both effects reduce the pulp discharge consistency. A better solution according to the present invention is to provide a flow restrictor at the valve inlet to allow the filtrate to flow into the valve box but prevent air from bypassing the liquid.

Several versions of a flow restrictor according to the present invention are shown in FIGS. 4–8. Each of the four alternatives describe the lower section of the flow channel as open for filtrate liquor flow but the air flow in the upper section of the channel is blocked off or partially blocked off as shown in the sketches. Any air passing through the restrictor must flow with the same velocity as the liquor.

Figure 5:
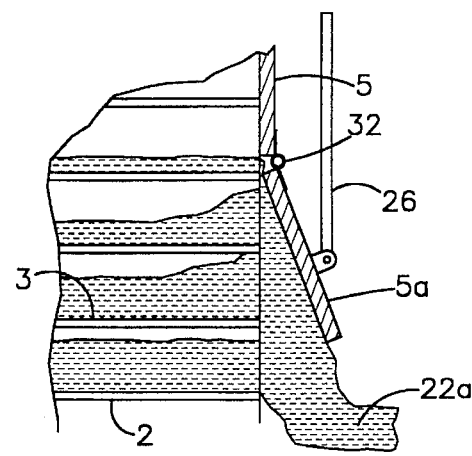
FIG. 5 is a schematic cross section of the segmented channel and adjustable seal plate according to the present invention showing an end view of a variable movable flow restrictor hinged to the timing plate.

In the first embodiment of the present invention shown in FIGS. 4 and 5, a seal plate extension 5a is shown connected by a hinge 32 to the seal plate 5. As shown best in FIG. 5, this provides a restriction to the flow of filtrate liquor and effectively blocks the flow of air into the vacuum box. The variable feature of this embodiment provides for the adjustment necessary to handle a wide variety of pulp. Adjustment of the variable restriction is accomplished by a rod 26 which exits through the valve body or housing 15 and the vacuum box to permit online adjustment.

Figure 6:
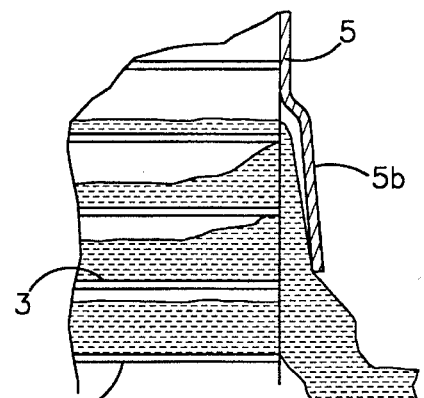
FIG. 6 shows a schematic as defined in FIG. 5 having a varying relief fixed extension to the timing plate as a first alternative.

A fixed version of a flow restrictor is shown in FIG. 6 wherein the seal plate is extended away from the face of the end of the segmented channel 3. This is accomplished by bending out the seal plate 5 at the portion 5b as shown in FIG. 6.

Figure 7:
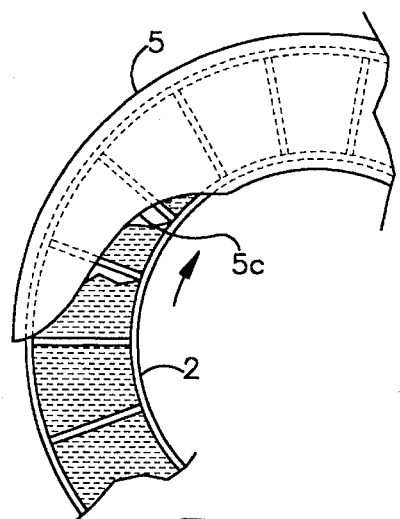
FIG. 7 shows a second alternative timing plate arcuately relieved in accordance with the present invention.

FIG. 7 shows an alternative method of restricting the flow in that the seal plate 5 is cut away in an arcuate curve 5c to extend upward and radially inward to provide restriction to the air flow and permit recovery of the vacuum filtrate.

Figure 8:
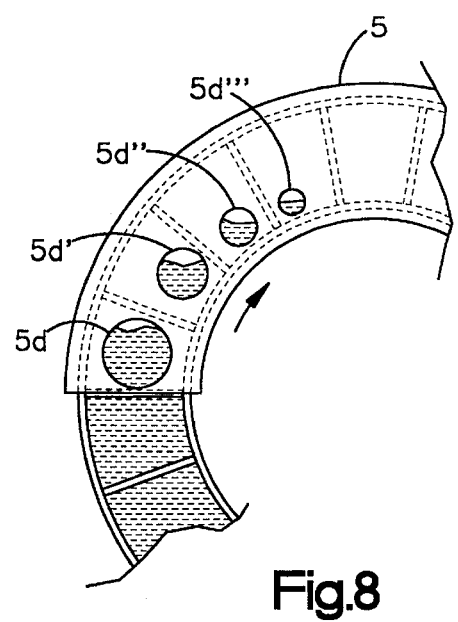
FIG. 8 depicts a third alternative showing the timing plate relieved by a series of circular cutouts decreasing in the direction of rotation both in size and radial disposition according to the present invention.

FIG. 8 shows a fourth alternative wherein the seal plate 5 is shown perforated by a series of decreasing circular ports 5d–5d'''. It should be noted, particularly in the embodiment shown in FIGS. 4, 7, and 8 that, due to the trapezoidal geometry and the circular orientation of the segmented drainage channels 3, it is advantageous according to the present invention to skew the relief radially inward as you proceed upward in the direction of rotation. This permits the maximum flow of filtrate while minimizing the open area available for air flow.

Having described my invention in terms of a preferred embodiment, I do not wish to be limited in the scope of my invention except as claimed.

What is claimed is:

1. A valve for a rotary filter having discrete filter elements entering and emerging from a submerged filter zone comprising:

a hollow valve body having one end essentially open for receiving filtrate collected in segmented channels radially disposed about the center of a filter shaft, the segmented channels further receiving filtrate from filter elements of discretely varying composition of filtrate volume and bypass gas, at least one of said segmented channels being divided into a gas portion and a liquid portion;

a collection means having port means for controlling the receiving of said filtrate disposed at said one end of said valve body, said collection means including a disc plate, the port means being radially selectively distributed about its face;

a chamber formed within said valve body for receiving said filtrate;

a vacuum means in communication with said chamber for withdrawing collected filtrate from said chamber; and said collection means being further provided with a means for selectively restricting the amount of bypass gas entering said valve body while continuing to permit filtrate flow onto said valve body on transition of said filter from said submerged filter zone, said means for selectively restricting the amount of bypass gas entering said valve body comprising a portion of said disc plate substantially closing off said gas portion of said at least one segmented channel.

2. A valve for a rotary filter according to claim 1 wherein said means for selectively restricting gas bypass further comprises:

an adjustable restriction.

3. A valve for a rotary filter having discrete filter elements entering and emerging from a submerged filter zone comprising:

a hollow valve body having one end essentially open for receiving filtrate collected in segmented channels radially disposed about the center of a filter shaft, the segmented channels further receiving filtrate from filter elements of discretely varying composition of filtrate volume and bypass gas;

a collection means having port means for controlling the receiving of said filtrate disposed at said one end of said valve body;

a chamber formed within said valve body for receiving said filtrate;

a vacuum means in communication with said chamber for withdrawing collected filtrate from said chamber; and said collection means being further provided with a means for selectively restricting the amount of bypass gas entering said valve body while continuing to permit filtrate flow onto said valve body on transition of said filter from said submerged filter zone, said means for selectively restricting gas bypass comprising an adjustable restriction, said adjustable restriction comprising a hinged plate attached to a leading edge of said collection means.

4. A valve for a rotary filter according to claim 3, wherein:

said adjustable restriction means is provided with a means for online adjustment.

5. A valve for a rotary filter according to claim 4, wherein:

said means for online adjustment further comprises a movable rod operable from a position outside of the valve in normal operation.

6. A valve for a rotary filter having discrete filter elements entering and emerging from a submerged filter zone comprising:

a hollow valve body having one end essentially open for receiving filtrate collected in segmented channels radially disposed about the center of a filter shaft, the segmented channels further receiving filtrate from filter elements of discretely varying composition of filtrate volume and bypass gas;

a collection means having port means for controlling the receiving of said filtrate disposed at said one end of said valve body;

a chamber formed within said valve body for receiving said filtrate;

a vacuum means in communication with said chamber for withdrawing collected filtrate from said chamber; and said collection means being further provided with a means for selectively restricting the amount of bypass gas entering said valve body while continuing to permit filtrate flow onto said valve body on transition of said filter from said submerged filter zone, said means for selectively restricting gas bypass comprising a deformation of said collection means permitting it to be increasingly spaced apart from said segmented channels at a leading edge as a means for providing a varied restriction to filtrate flow increasing in the direction of rotation.

7. A valve for a rotary filter having discrete filter elements entering and emerging from a submerged filter zone comprising:

a hollow valve body having one end essentially open for receiving filtrate collected in segmented channels radially disposed about the center of a filter shaft, the segmented channels further receiving filtrate from filter elements of discretely varying composition of filtrate volume and bypass gas;

a collection means having port means for controlling the receiving of said filtrate disposed at said one end of said valve body;

a chamber formed within said valve body for receiving said filtrate;

a vacuum means in communication with said chamber for withdrawing collected filtrate from said chamber; and said collection means being further provided with a means for selectively restricting the amount of bypass gas entering said valve body while continuing to permit filtrate flow onto said valve body on transition of said filter from said submerged filter zone, said means for selectively restricting gas bypass comprising an arcuate section cut out of said collection means at a leading edge.

8. A valve for a rotary filter according to claim 7, wherein:

said arcuate section is cut to progress from a lower radially outward position to an upper radially inward position in the direction of rotation.

9. A valve for a rotary filter having discrete filter elements entering and emerging from a submerged filter zone comprising:

a hollow valve body having one end essentially open for receiving filtrate collected in segmented channels radially disposed about the center of a filter shaft, the segmented channels further receiving filtrate from filter elements of discretely varying composition of filtrate volume and bypass gas;

a collection means having port means for controlling the receiving of said filtrate disposed at said one end of said valve body;

a chamber formed within said valve body for receiving said filtrate;

a vacuum means in communication with said chamber for withdrawing collected filtrate from said chamber; and said collection means being further provided with a means for selectively restricting the amount of bypass gas entering said valve body while continuing to permit filtrate flow onto said valve body on transition of said filter from said submerged filter zone, said means for selectively restricting gas bypass comprising a series of perforations in said collection means.

10. A valve for a rotary filter according to claim 9, wherein:

said perforations are progressively smaller from a lower to an upper position in the direction of rotation.

11. A valve for a rotary filter according to claim 9, wherein:

said perforations are located progressively radially inward from a lower to an upper position in the direction of rotation.

12. A valve for rotary filter according to claim 9, wherein:

said perforations are circular.

* * * * *